United States Patent
Zhang et al.

(10) Patent No.: US 8,155,114 B2
(45) Date of Patent: Apr. 10, 2012

(54) ACCESS DEVICE AND METHOD FOR COMMUNICATION BETWEEN MASTER SHELF AND SLAVE SHELF

(75) Inventors: Junguang Zhang, Shenzhen (CN);
Daoming Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 349 days.

(21) Appl. No.: 12/497,218

(22) Filed: Jul. 2, 2009

(65) Prior Publication Data

US 2009/0268741 A1 Oct. 29, 2009

Related U.S. Application Data

(63) Continuation of application No. PCT/CN2008/070861, filed on Apr. 30, 2008.

(30) Foreign Application Priority Data

Apr. 30, 2007 (CN) .......................... 2007 1 0074177

(51) Int. Cl.
*H04Q 11/00* (2006.01)
*H04L 12/28* (2006.01)
*G06F 15/16* (2006.01)
*G06F 15/177* (2006.01)

(52) U.S. Cl. ........ 370/386; 370/254; 370/419; 709/208; 709/220

(58) Field of Classification Search .................. 370/351, 370/395.1, 419, 386, 254; 709/208, 220
See application file for complete search history.

(56) References Cited

U.S. PATENT DOCUMENTS

| 5,930,235 | A | 7/1999 | Arai | |
|---|---|---|---|---|
| 6,230,200 | B1 * | 5/2001 | Forecast et al. | 709/226 |
| 7,639,605 | B2 * | 12/2009 | Narayanan et al. | 370/219 |
| 7,751,416 | B2 * | 7/2010 | Smith et al. | 370/410 |
| 7,778,230 | B2 * | 8/2010 | Fulknier et al. | 370/338 |

(Continued)

FOREIGN PATENT DOCUMENTS

CN 101047597 A 10/2007

(Continued)

OTHER PUBLICATIONS

International Search Report from P.R. China in International Application No. PCT/CN2008/070861 mailed Aug. 14, 2008.

*Primary Examiner* — Ayaz Sheikh
*Assistant Examiner* — Hoang-Chuong Vu
(74) *Attorney, Agent, or Firm* — Finnegan, Henderson, Farabow, Garrett & Dunner LLP (57) ABSTRACT

A method and apparatus for communication between the master shelf and the slave shelf of an access device is provided. The method includes these a main control board of the master shelf configures a Media Access Control (MAC) address for a main control board of the slave shelf, the main control board of the master shelf configures a MAC address for a service board of the master shelf; and the main control board of the slave shelf configures a MAC address for a service board of the slave shelf, and communication is performed between the main control board of the master shelf and the main control board of the slave shelf, and between the main control board of the master shelf and the service board through the configured MAC address, where the MAC address includes information about the location of the main control board or the service board.

11 Claims, 6 Drawing Sheets

U.S. PATENT DOCUMENTS

| | | | |
|---|---|---|---|
| 7,792,017 B2 * | 9/2010 | Lu et al. | 370/217 |
| 7,966,388 B1 * | 6/2011 | Pugaczewski et al. | 709/223 |
| 2002/0188718 A1 * | 12/2002 | McGraw et al. | 709/224 |
| 2004/0024831 A1 * | 2/2004 | Yang et al. | 709/208 |
| 2004/0153697 A1 * | 8/2004 | Chang et al. | 714/4 |
| 2005/0047098 A1 * | 3/2005 | Garnett et al. | 361/735 |
| 2006/0218326 A1 * | 9/2006 | Tanaka | 710/104 |
| 2007/0183313 A1 * | 8/2007 | Narayanan et al. | 370/216 |
| 2008/0270673 A1 * | 10/2008 | Sridhar et al. | 711/6 |
| 2011/0019651 A1 * | 1/2011 | Fulknier et al. | 370/338 |

FOREIGN PATENT DOCUMENTS

| | | |
|---|---|---|
| JP | 2001-169372 | 6/2001 |
| WO | WO 01/99318 A1 | 12/2001 |

* cited by examiner

ACCESS DEVICE AND METHOD FOR COMMUNICATION BETWEEN MASTER SHELF AND SLAVE SHELF

CROSS-REFERENCE TO RELATED APPLICATIONS

This application is a continuation of International Patent Application No. PCT/CN2008/070861, filed on Apr. 30, 2008, which claims priority to Chinese Patent Application No. 200710074177.6, filed on Apr. 30, 2007, both of which are hereby incorporated by reference in their entirety.

TECHNICAL FIELD

Embodiments disclosed herein relate to the communication field, and in particular, to an access device and a method for communication between a master shelf and a slave shelf of the access device.

BACKGROUND

It is generally believed that a Multi-Service Access Node (MSAN) is composed of narrowband service shelves and broadband service shelves.

Currently, in the pure narrowband application field, the access device is designed with a slave shelf. This solution is based on a Time Division Multiplex (TDM) system, where the master shelf and the slave shelf are physically connected through E1, and logically interconnected through an internal private protocol.

In the application field of the broadband digital subscriber line, a single-shelf solution is applied in an access device such as a Digital Subscriber Line Access Multiplexer (DSLAM), and no slave shelf is supported. With the increase of users, more and more devices are added to the communication system, and more nodes need to be managed, thus making the management complicated.

In the Asynchronous Transfer Mode (ATM) application field, the Broadband Loop Emulation Service (BLES) does not involve the networking application of slave shelves either.

In the application field that integrates broadband and narrowband (for example, the BLES protocol is extended to the Extended Broadband Loop Emulation Service (XBLES) protocol), the extended protocol defines communication between the Plain Old Telephone Service (POTS) subscriber board and the protocol processing board, and voice services are implemented on the basis of the Ethernet, without involving the networking application of the broadband/narrowband slave shelves.

In a technical solution in the related art, a narrowband access device, for example, a pure narrowband device, or an access media gateway, may provide master-and-slave shelf networking through a TDM network, where the master shelf and the slave shelf are physically connected through E1 and logically interconnected through an internal private protocol. If the master shelf and the slave shelf are in different equipment rooms, a transmission system is required between them. The transmission system may be regarded as transparent. If the master shelf and the slave shelf are in the same rack, the master shelf and the slave shelf may be interconnected through a HighWay (HW) in view of a short distance between them. In E1/HW interconnection mode, the communication between the master shelf and the slave shelf is defined by the manufacturer, without passing through the devices from other manufacturers. Even if a transmission system is deployed between the master shelf and the slave shelf, the privacy of the network is still ensured.

With respect to management, communication may be implemented between the master shelf and the Network Management System (NMS) in Ethernet in-band mode, or Ethernet out-band mode, or E1 in-band mode. The Ethernet may be a Fast Ethernet (FE) or a Gigabit Ethernet (GE). However, the foregoing master-and-slave shelf networking solution can only be based on a TDM system, and cannot be transplanted to an Ethernet system simply. If the communication between the master shelf and the slave shelf passes through a layer-2 or layer-3 switch or router from manufacturers, the circumstance becomes much more complicated.

In another technical solution in the related art, a DSLAM works as an access device by using a single-shelf solution. For the NMS, each broadband shelf is a stand-alone device, namely, a stand-alone network element. Each broadband device may be connected to the NMS in FE in-band or out-band mode or GE in-band or out-band mode.

In this solution, however, each shelf is a stand-alone network element, without supporting slave shelf networking. Even for multiple broadband shelves in the same rack, each broadband shelf needs to be managed as a stand-alone network element. Therefore, many nodes need to be managed; many Internet Protocol (IP) addresses need to be occupied; and the management is complicated. Moreover, all the broadband shelves need to provide the same main control board, which is costly.

In another technical solution in the related art, for an MSAN, a service shelf may hold a narrowband voice service board and a broadband service board at the same time. Therefore, a service shelf may be logically divided into a narrowband service shelf and a broadband service shelf. Generally, for ease of management, an operator configures broadband service boards in one shelf, and configures narrowband service boards in the other shelf.

If a TDM bus is applied between the narrowband service shelves, the master-slave shelf solution is supported, and all the shelves are embodied as one network element to the outside; if an Ethernet bus is applied between the narrowband service shelves, no slave shelf is supported, and each narrowband service shelf is embodied as a stand-alone network element to the outside. With respect to broadband service shelves, each broadband service shelf is embodied as a stand-alone network element to the outside.

In an MSAN where the narrowband system is based on a TDM bus but the broadband device is based on an Ethernet bus, all narrowband service shelves may constitute one network element, and each broadband service shelf is a stand-alone network element. If there is only one broadband service shelf, the broadband service shelf may be combined with the narrowband service shelves into the same network element. The management is rather complicated especially in an MSAN where one rack contains multiple narrowband service shelves or broadband service shelves.

For an MSAN based on the Ethernet completely, no slave shelf is supported, and each service shelf is embodied as a stand-alone network element to the outside. In this case, the management is complicated, and each shelf requires an IP address.

Therefore, the Ethernet-based slave shelf cascade in the related art involves complicated network management and high costs of maintenance and management.

BRIEF SUMMARY

An access device and a method for communication between the master shelf and the slave shelf of the access device are provided in embodiments of the present invention to simplify the network management and reduce costs of maintenance and management.

An access device is provided in some embodiments. The access device includes a master shelf and at least one slave shelf.

The master shelf includes a main control board and a service board. The main control board and the service board of the master shelf are connected through an Ethernet bus, and the service board communicates with the main control board of the master shelf in Media Access Control (MAC) address forwarding mode.

The slave shelf includes a main control board and a service board. The main control board and the service board of the slave shelf are connected through an Ethernet bus, and the service board communicates with the main control board of the slave shelf in MAC address forwarding mode.

Both the master shelf and the slave shelf contain an interface unit. Each interface unit provides at least one Ethernet interface. The interface unit of the master shelf is connected to the interface unit of the slave shelf.

The main control board of the slave shelf communicates with the main control board of the master shelf in MAC address forwarding mode. The MAC address includes information about the location of the main control board or service board.

A method for communication between the master shelf and the slave shelf of an access device is provided is also provided in some embodiments of the present disclosure. The method includes configuring, by a main control board of the master shelf, a MAC address for a main control board of the slave shelf, configuring, by the main control board of the master shelf, a MAC address for a service board of the master shelf; and, configuring, by the main control board of the slave shelf, a MAC address for a service board of the slave shelf, and performing communication between the main control board of the master shelf and the main control board of the slave shelf and between the main control board and the service board of the master shelf through the configured MAC address, where the MAC address contains information about the location of the main control board or service board.

The disclosed embodiments may allow the integration of a Local Area Network (LAN) switching chip with the main control board of the master shelf and the main control board of the slave shelf, and may allow the connection of the master shelf to the slave shelf through an interface unit, and the connection of different slave shelves through the interface unit, where the connection mode is direct connection or connection across a layer-2 network, thus simplifying the network management in the slave shelf cascade system and reducing the costs of maintenance and management.

BRIEF DESCRIPTION OF THE DRAWINGS

FIG. 2 shows implementation of slave shelf cascade management packets in an.

DETAILED DESCRIPTION OF THE DISCLOSED EMBODIMENTS

The embodiments of the present invention are detailed below with reference to accompanying drawings.

Figure 1:
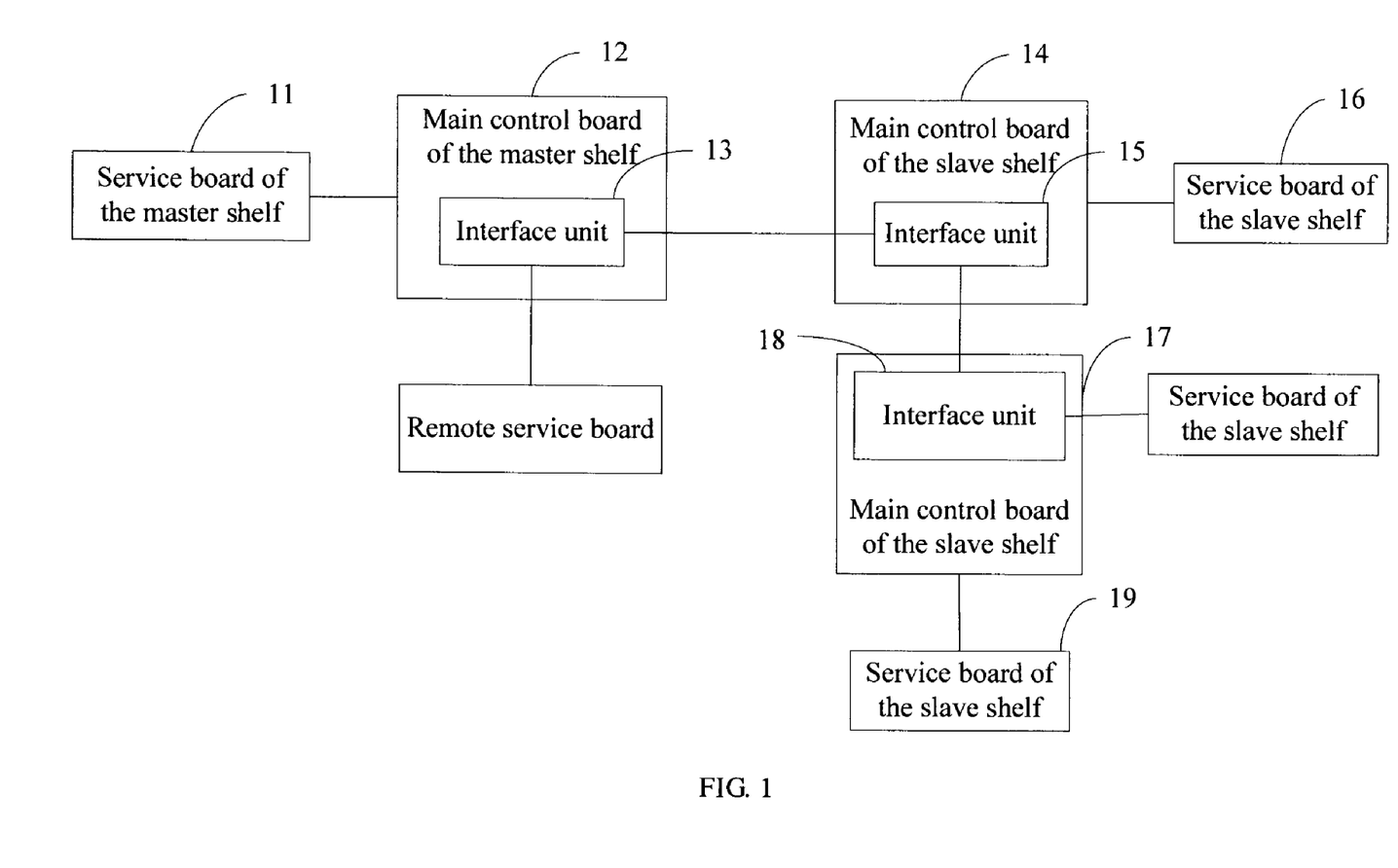
FIG. 1 shows a structure of an access device provided in an embodiment.

FIG. 1 shows a structure of an access device provided in an embodiment.

As shown in FIG. 1, the service board 11 of the master shelf is directly connected to the main control board 12 of the master shelf through an Ethernet bus (not illustrated in FIG. 1) on a backplane. A LAN switching chip, such as LanSwitch (LSW), is integrated with the main control board 12 of the master shelf. The LAN switching chip provides an Ethernet interface for the outside. When service board 11 of the master shelf is connected to main control board 12 of the master shelf, the physical interface may be an FE/GE interface, or any other Ethernet interface.

An interface unit 13 is integrated with main control board 12 of the master shelf, and is connected to main control board 12 of the master shelf through an Ethernet bus (not illustrated in FIG. 1) on the backplane. Interface unit 13 provides an extended FE/GE interface, or any other Ethernet interface.

An interface unit 15 is integrated with a main control board 14 of the slave shelf, and is connected to main control board 14 of the slave shelf through an Ethernet bus (not illustrated in FIG. 1) on the backplane. Interface unit 15 provides an extended FE/GE interface, or any other Ethernet interface.

In this embodiment, interface unit 13 set on main control board 12 of the master shelf is connected to interface unit 15 set on main control board 14 of the slave shelf. The connection mode may be direct connection or connection across a layer-2 network.

In practice, main control board 12 of the master shelf may be connected through interface unit 13 to multiple main control boards on which an interface unit is set in the slave shelf. The connection mode may be direct connection or connection across a layer-2 network.

Main control board 14 of the slave shelf is connected to a service board 16 of the slave shelf. A LAN switching chip is integrated with main control board 14 of the slave shelf. The LAN switching chip provides an Ethernet interface. When main control board 14 of the slave shelf is connected to service board 16 of the slave shelf, the physical interface may be an FE/GE interface, or any other Ethernet interface.

Main control board 14 of the slave shelf is connected through interface unit 15 to interface unit 18 set in main control board 17 of the slave shelf. The connection mode may be direct connection or connection across a layer-2 network.

In practice, main control board 14 of the slave shelf may be connected through interface unit 15 to multiple main control boards on which an interface unit is set in the slave shelf. The connection mode may be direct connection or connection across a layer-2 network.

In practice, with respect to the master shelf, the interface unit may be integrated with the main control board of the master shelf, and the local area switching network port is extended directly. Nevertheless, the interface unit may be a stand-alone interface board (not illustrated in the figure), and the local area switching network port of the main control board of the master shelf may be extended through a backplane bus. The main control board of the master shelf may be connected to a remote service board through an extended Ethernet interface provided by the interface unit. The connection mode may be direct connection or connection across a layer-2 network.

With respect to the slave shelf, the interface unit may be integrated with the main control board of the slave shelf, and the local area switching network port is extended directly. Nevertheless, the interface unit may be a stand-alone interface board (not illustrated in the figure), and the local area switching network port on the main control board of the slave shelf may be extended through a backplane bus. The main control board of the slave shelf may be connected to a remote service board through an extended Ethernet interface provided by the interface unit. The connection mode may be direct connection or connection across a layer-2 network.

In this embodiment, a LAN switching chip is integrated with the main control board of the master shelf and the main control board of the slave shelf; through the interface unit that includes a LAN switching chip, the master shelf is connected to the slave shelf, and the slave shelf is connected to its subordinate slave shelf, where the connection mode is direct connection or connection across a layer-2 network, thus simplifying the network management in the slave shelf cascade system and reducing the costs of maintenance and management.

Figure 2:
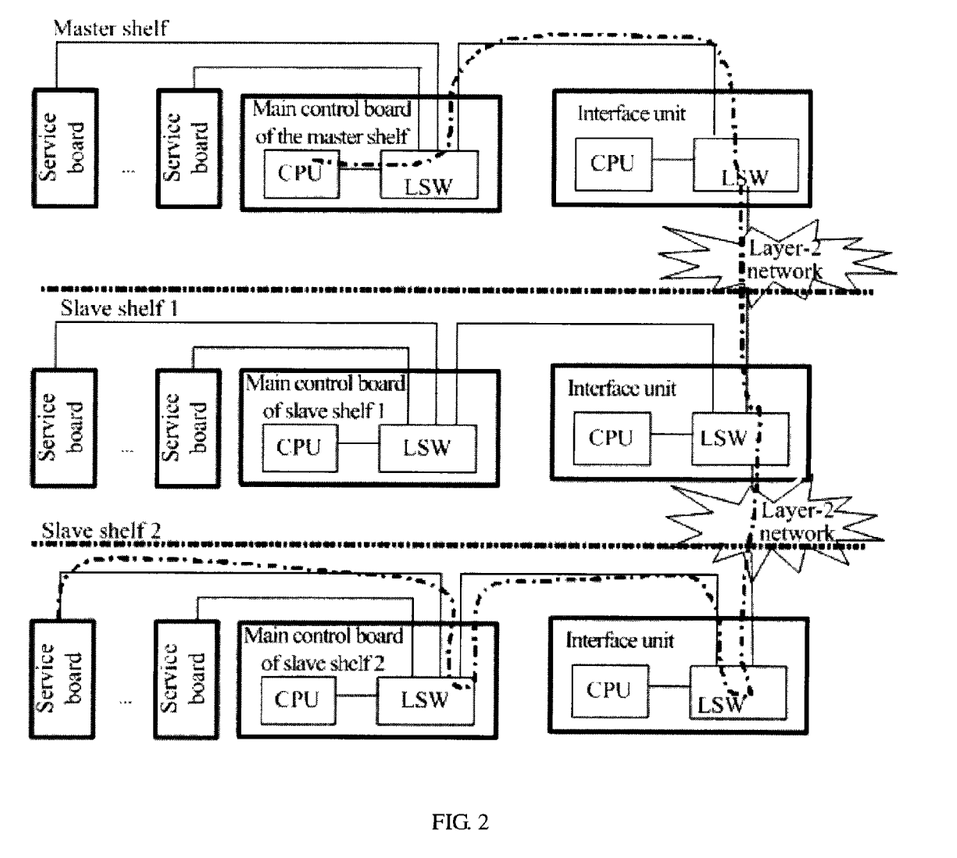

According to some embodiments, the master shelf communicates with the slave shelf of the access device by defining a management packet between the master shelf and the slave shelf. A private communication protocol in the Ethernet layer is used to exchange management packets between the master shelf and the slave shelf. As shown in FIG. 2, in the case of direct connection or a pure layer-2 network, each service board communicates with the main control board of the master shelf directly in MAC address forwarding mode. Specifically, to identify this type of management packets, a special Ethernet frame type may be defined.

The main control board of the master shelf may interwork with the service boards directly only if each service board has a different MAC address. For example, the information about the location of the board, for example, the shelf ID and slot ID of the board, is identified in the MAC address. Each MAC address is identified by 6 bytes. The highest 3 or 4 bytes are generally allocated to the manufacturer, and the lowest 3 or 2 bytes may be provided to the manufacturer for being allocated at the manufacturer's discretion. For example, the lowest 3 or 2 bytes of the MAC address are set as the location information of the service board. In this way, even if two service boards have the same highest byte, the two service boards have different shelf IDs or slot IDs, and do not conflict in the management domain of the same device, thus avoiding MAC address conflict. For two different devices, if the management Virtual LAN (VLAN) corresponding to the first device is different from that corresponding to the second device, the service board of the first device does not conflict with the service board of the second device in the layer-2 network. The slot ID in the MAC address may be determined according to the slot of the service board. The shelf ID can be identified by configuring a management VLAN.

Figure 3:
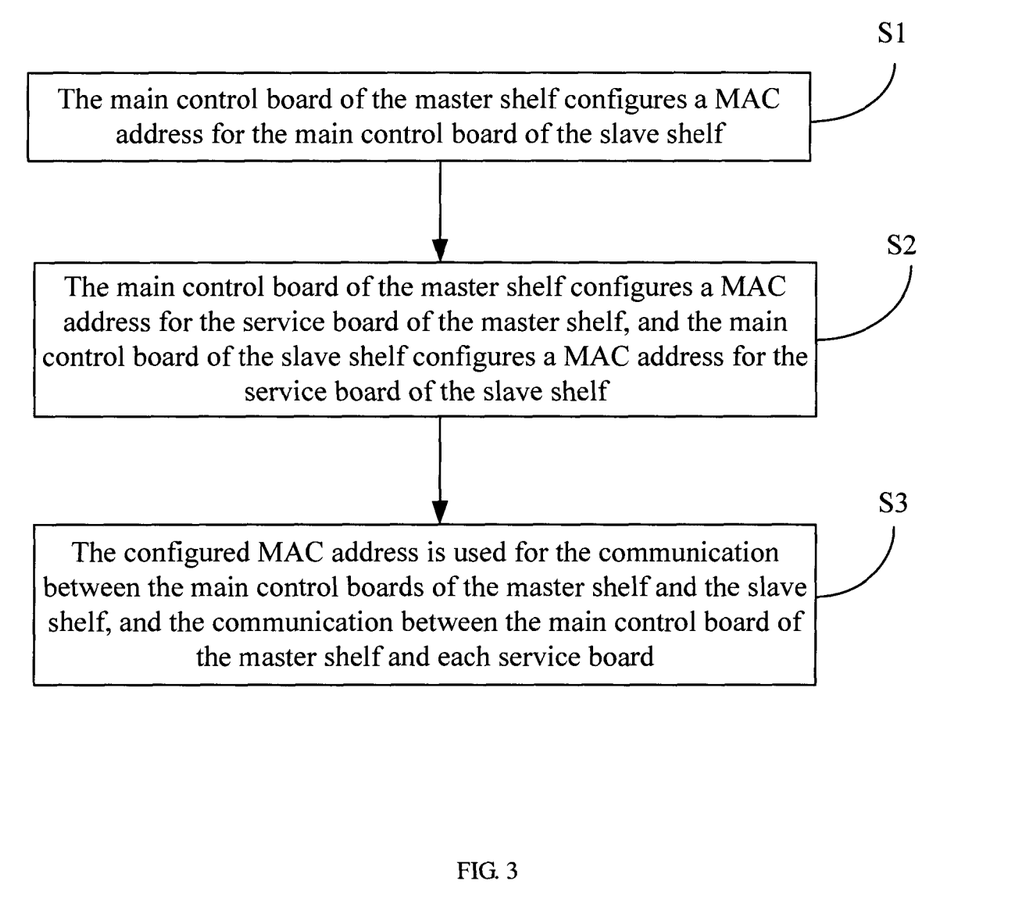
FIG. 3 is a flowchart of a method for communication between a master shelf and a slave shelf of an access device according an embodiment such as is illustrated in FIG. 2.

As shown in FIG. 3, a method for communication between the master shelf and the slave shelf of an access device according to some embodiments includes the following steps:

Step S1: The main control board of the master shelf configures a MAC address for the main control board of the slave shelf.

As described above, before step S1, it is necessary to configure the mapping relationship between the management VLAN ID and the shelf ID of each slave shelf on the main control board of the master shelf, and configure the management VLAN ID of the local shelf and the destination MAC address of the main control board of the master shelf on the main control board of each slave shelf.

Figure 4:
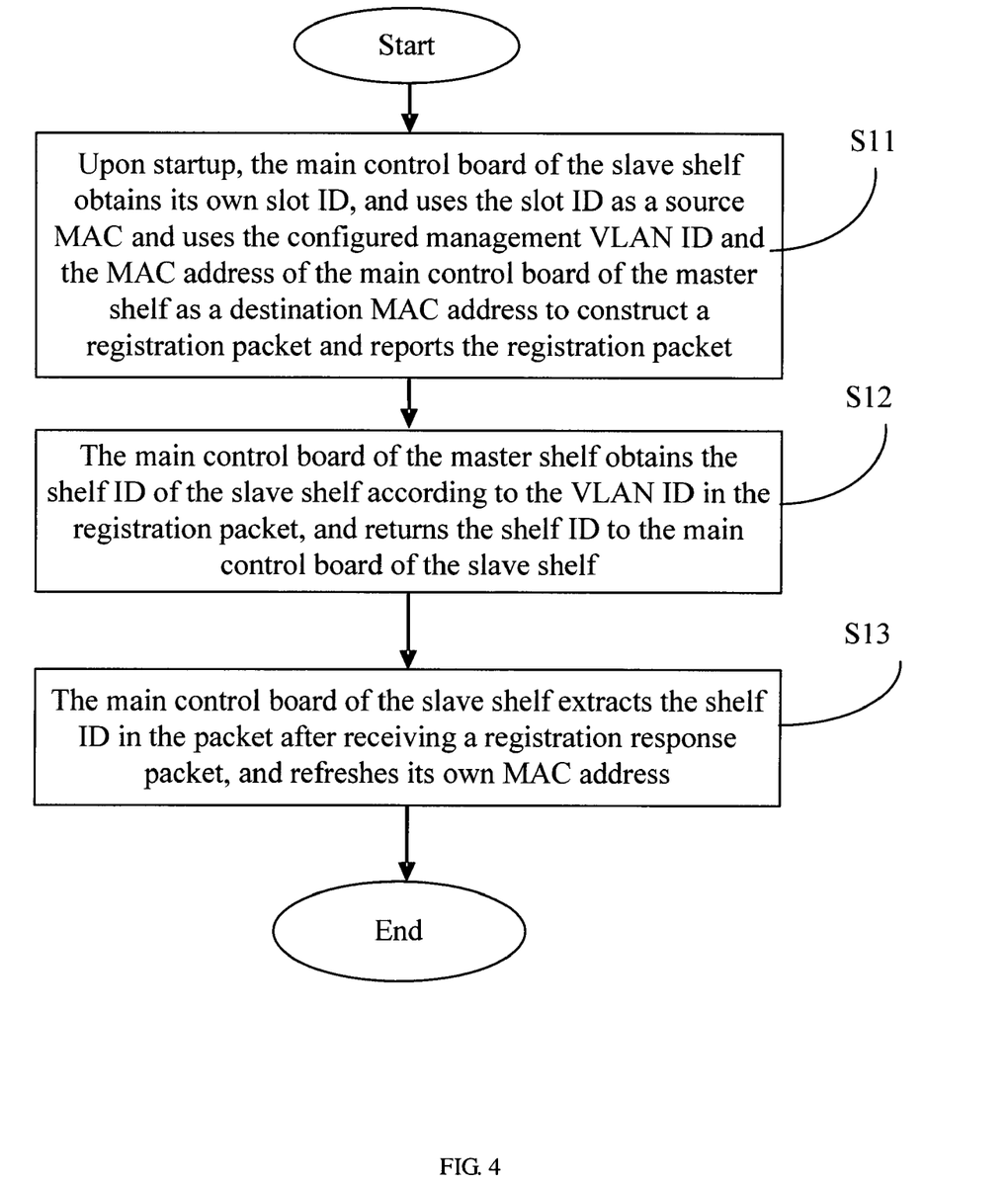
FIG. 4 is a flowchart of configuring a main control board of a slave shelf according to an embodiment, such as is illustrated in FIG. 2.

As shown in FIG. 4, step S1 includes:

Step S11: When being initialized upon startup, the main control board of the slave shelf obtains its slot ID first, uses this slot ID as a source MAC address of the registration packet, uses the destination MAC address of the main control board of the master shelf as the destination MAC address of the registration packet, uses the management VLAN ID of the main control board of the slave shelf as the VLAN ID of the registration packet (the packet is forwarded in MAC address mode), and reports the registration packet to the main control board of the master shelf.

Besides, the shelf ID of the main control board of the slave shelf may be configured on the main control board of the slave shelf directly. In this case, all the slave shelves may use the same management VLAN. Upon startup of the main control board of the slave shelf, the main control board of the slave shelf knows its own shelf ID or slot ID. Therefore, the main control board of the slave shelf registers with the main control board of the master shelf directly, without obtaining its own shelf ID.

Step S12: After receiving the registration packet, the main control board of the master shelf queries for the corresponding VLAN according to the VLAN ID in the registration packet, obtains the shelf ID of the slave shelf, and then returns the shelf ID to the main control board of the slave shelf through a registration response packet.

Step S13: After receiving the registration response packet, the main control board of the slave shelf extracts the shelf ID in the registration response packet, and refreshes its own MAC address. In the subsequent communication with the main control board of the master shelf, this MAC address serves as a source MAC.

Step S2: The main control board of the master shelf configures a MAC address for the service board of the master shelf, and the main control board of the slave shelf configures a MAC address for the service board of the slave shelf.

Figure 5:
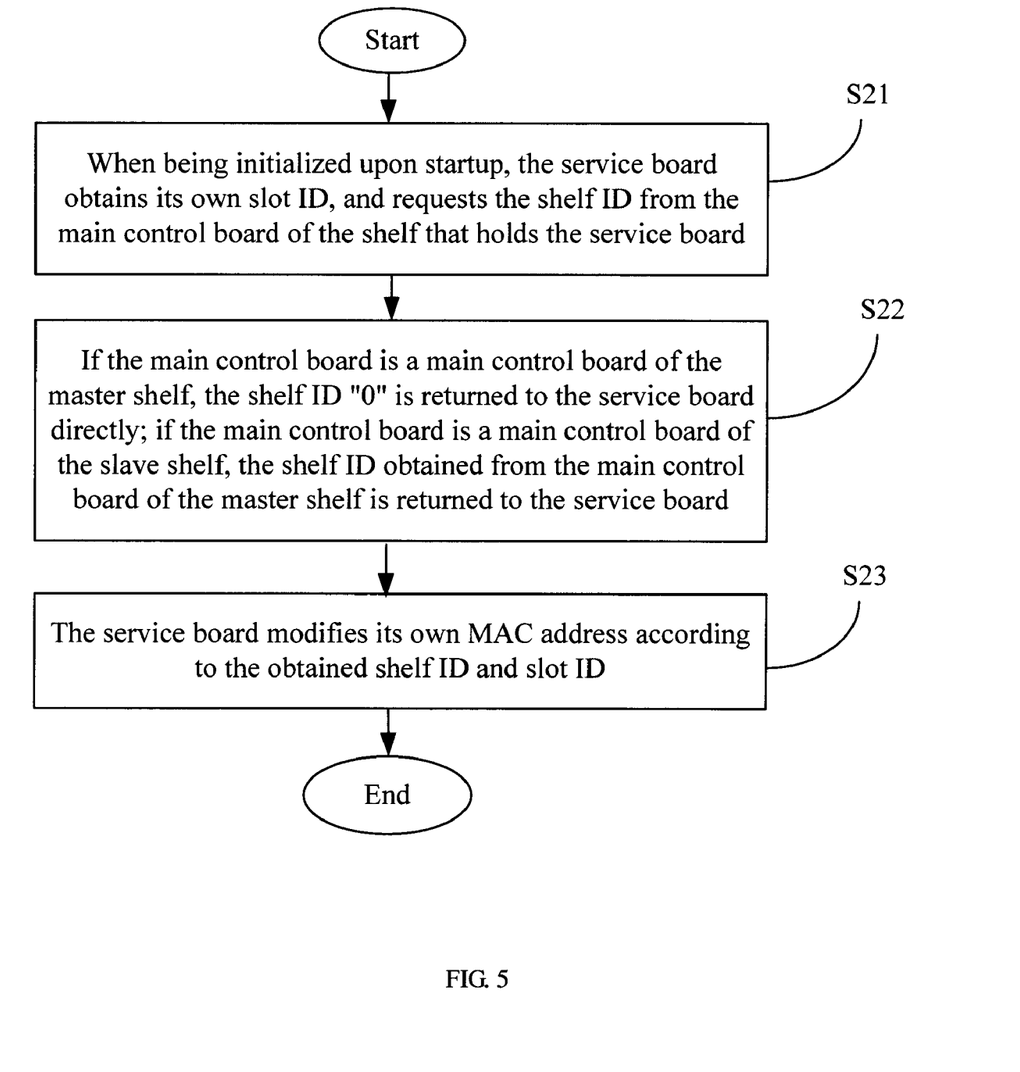
FIG. 5 is a flowchart of configuring a service board according to an embodiment, such as is illustrated in FIG. 2.

As shown in FIG. 5, step S2 includes:

Step S21: When being initialized upon startup, the service board obtains its own slot ID, and requests the shelf ID from the main control board of the local shelf.

Step S22: If the main control board is a main control board of the master shelf, the shelf ID "0" is returned to the service board directly. If the main control board is a main control board of the slave shelf, the shelf ID obtained from the main control board of the master shelf is returned to the service board.

Step S23: The service board modifies its own MAC address according to the obtained shelf ID and slot ID. In the subsequent communication with the main control board of the master shelf, this MAC address serves as a source MAC.

Step S3: The configured MAC address is used for the communication between the main control boards of the master shelf and the slave shelf, and the communication between the main control board of the master shelf and each service board.

The main control board of the master shelf implements service switching with each service board through an internal communication protocol. The internal communication protocol encapsulates Ethernet packets through an Ethernet frame type that identifies internal communication.

Figure 6:
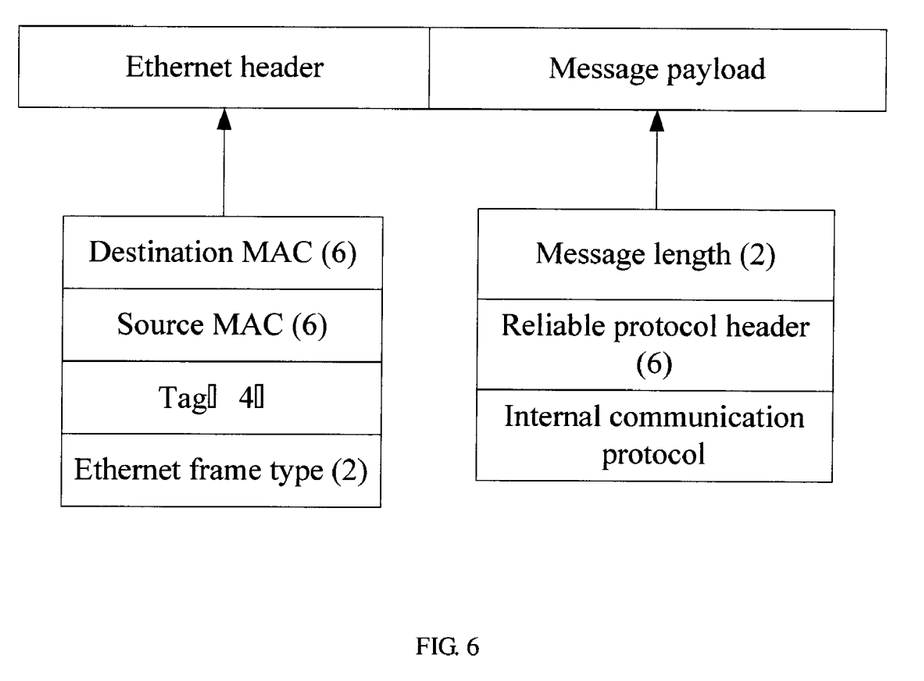
FIG. 6 shows a structure of an Ethernet frame type in an embodiment.

FIG. 6 shows a structure of an Ethernet frame type according to an embodiment. The internal communication protocol is identified by defining the Ethernet frame type shown in FIG. 6. Generally the layer-2 network does not check this field. Therefore, this field can traverse the layer-2 network.

A reliable transmission protocol is defined in the layer-2 frame content to ensure reliability of communication between the service board and the main control board of the master shelf. The reliable protocol may be a Q.921 or a Stream Control Transport Protocol (SCTP).

The internal communication protocol defines the interaction of the registration, configuration, state, and service between the main control board and the service board of the master/slave shelf.

In this embodiment, the main control board of the master shelf manages all shelfs/service boards, and provides a Simple Network Management Protocol (SNMP) interface. All the shelves/service boards are embodied as the same network element to the outside. Therefore, for each service board, the main control board of the local shelf configures the MAC address and the management VLAN ID of the service board first. However, after the basic communication information is obtained, all the management is performed through direct interaction between the service board and the main control board of the master shelf, without using the main control board of the slave shelf to handle any management packet or service packet. In this way, the burden on the main control board of the slave shelf is relieved and the costs are reduced.

For example, for all voice services, the main control board of the master shelf configures the service boards to implement the communication information of voice packets, for example, voice control packets and voice service packets. To relieve the performance pressure on the main control board of the master shelf, a separate voice protocol processing board may be provided to control the call processing.

Specifically, for a service board, after the MAC address and the management VLAN ID of the service board as well as the management VLAN ID of the main control board of the master shelf are obtained through the foregoing communication process, the service board communicates with the main control board of the master shelf first to obtain the communication mode of the subsequent voice control packets and voice service packets. The main control board of the master shelf configures the destination MAC address/VLAN ID of the voice control packet, and the destination MAC address and VLAN ID of the voice service packet for the service board. Such MAC addresses or VLAN IDs may be consistent or inconsistent with the management MAC addresses or VLAN IDs. The user configures the specific mode on the main control board of the master shelf according to the networking.

In another example, the control packets such as broadband PPPoE or IGMP packets are also implemented on the main control board of the master shelf. The main control board of the master shelf configures the broadband service board to implement the communication information of broadband control packets and broadband service packets. For a broadband service board, after the MAC address and the management VLAN ID of the broadband service board as well as the management VLAN ID of the main control board of the master shelf are obtained, the broadband service board communicates with the main control board of the master shelf first to obtain the communication mode of the subsequent broadband control packets and broadband service packets.

Consistent with the disclosed embodiments, those skilled in the art are clearly aware that the disclosed embodiments may be implemented through hardware, or through software in addition to a necessary universal hardware platform. Accordingly, the disclosed embodiments may be tangibly embodied in a storage medium as a software product including several instructions that enable a computer device having a processor, such as a personal computer, a server, or a network device, to execute the instructions and perform the methods provided in the disclosed embodiments.

Although the disclosure has been described through several exemplary embodiments, the disclosure is not limited to such embodiments. It is apparent that those skilled in the art can make various modifications and variations to the present invention without departing from the spirit and scope of the present disclosure. The present disclosure is intended to cover such modifications and variations provided that they fall in the scope of protection defined by the following claims or their equivalents.

What is claimed is:

1. An access device, comprising:
a master shelf, comprising:
   a main control board of the master shelf; and
   a service board of the master shelf; and
a slave shelf, comprising:
   a main control board of the slave shelf; and
   a service board of the slave shelf,
wherein:
the main control board of the slave shelf is configured to obtain its own location information and encapsulate the location information into a source Media Access Control (MAC) address, encapsulate a registration packet by using a configured management Virtual Local Area Network (VLAN) ID of the main control board of the slave shelf and a MAC address of the main control board of the master shelf as a destination MAC address, and report the registration packet to the main control board of the master shelf,
the main control board of the master shelf is configured to query for a corresponding VLAN according to the management VLAN ID in the registration packet after receiving the registration packet, obtain a shelf ID of the slave shelf, and then return a registration response packet containing the shelf ID of the slave shelf to the main control board of the slave shelf,
the main control board of the slave shelf is further configured to extract, after receiving the registration response packet, the shelf ID of the slave shelf in the registration response packet, and refresh its own MAC address,
the main control board of the master shelf is further configured to configure a MAC address for the service board of the master shelf,
the main control board of the slave shelf is further configured to configure a MAC address for the service board of the slave shelf,
the main control board of the slave shelf is further configured to perform communication with the main control board of the master shelf through the configured MAC addresses,
the main control board of the master shelf is further configured to perform communication with the service board of the slave shelf through the configured MAC addresses,
each of the MAC addresses comprises information about a location of the main control board or a location of the service board of the master shelf or the slave shelf, and
the location information comprises a shelf ID and a slot ID.

2. The access device of claim 1, wherein:
the master shelf further comprises an interface unit being integrated with the main control board of the master shelf or being stand-alone; and the slave shelf further comprises an interface unit being integrated with the main control board of the slave shelf or being stand-alone.

3. The access device of claim 2, wherein:

multiple slave shelves of the access device are cascaded; and the interface unit of the master shelf is cascaded with the interface unit of the slave shelf through direct connection or through connection across a layer-2 network.

4. The access device of claim 1, wherein service switching is implemented between the master shelf and the slave shelf through an internal communication protocol; and the internal communication protocol encapsulates Ethernet packets through an Ethernet frame type that identifies internal communication.

5. The access device of claim 1, wherein the slave shelf is identified by the MAC address, the management Virtual Local Area Network (VLAN) ID, or the shelf ID.

6. The access device of claim 1, wherein the access device comprises: a Multi-Service Access Node (MSAN), a broadband access device, or a narrowband access device.

7. A method for communication between a master shelf and a slave shelf of an access device, comprising:

A. configuring a Media Access Control (MAC) address for a main control board of the slave shelf, comprising:

A1. by the main control board of the slave shelf, obtaining its own location information and encapsulating the location information into a source MAC address, encapsulating a registration packet by using a configured management Virtual Local Area Network (VLAN) ID of the main control board of the slave shelf and a MAC address of a main control board of the master shelf as a destination MAC address, and reporting the registration packet to the main control board of the master shelf;

A2. by the main control board of the master shelf, querying for a corresponding VLAN according to the management VLAN ID in the registration packet after receiving the registration packet, obtaining a shelf ID of the slave shelf, and then returning a registration response packet containing the shelf ID of the slave shelf to the main control board of the slave shelf; and A3. by the main control board of the slave shelf, extracting, after receiving the registration response packet, the shelf ID of the slave shelf in the registration response packet, and refreshing its own MAC address;

B. configuring, by the main control board of the master shelf, a MAC address for a service board of the master shelf, and configuring, by the main control board of the slave shelf, a MAC address for a service board of the slave shelf; and C. performing communication between the main control board of the master shelf and the main control board of the slave shelf, and between the main control board of the master shelf and the service board of the slave shelf through the configured MAC addresses, wherein each of the MAC addresses comprises location information of the corresponding board of the corresponding shelf, and wherein the location information comprises a shelf ID and a slot ID.

8. The method of claim 7, wherein if the shelf ID of the slave shelf is configured on the main control board of the slave shelf, the main control board of the slave shelf registers only with the main control board of the master shelf in step A1.

9. The method of claim 7, further comprising:

D. performing, by the main control board of the master shelf, service switching with each service board through an internal communication protocol, wherein the internal communication protocol encapsulates Ethernet packets through an Ethernet frame type that identifies internal communication.

10. The method of claim 7, wherein before step A1, the method further comprises:

configuring a mapping between a management Virtual Local Area Network (VLAN) ID, and a shelf ID of each slave shelf on the main control board of the master shelf; and configuring a management VLAN ID of the slave shelf and a destination MAC of the main control board of the master shelf on the main control board of the slave shelf.

11. A method for communication between a master shelf and a slave shelf of an access device, comprising:

A. configuring, by a main control board of the master shelf, a Media Access Control (MAC) address for a main control board of the slave shelf;

B. configuring a MAC address for a service board of the master shelf and a MAC address for a service board of the slave shelf, comprising:

B1. by the service board of the master shelf or the slave shelf, when being initialized upon startup, obtaining its own slot ID, and requesting a shelf ID of the corresponding shelf from the main control board of the corresponding shelf;

B2. for the master shelf, the main control board of the master shelf returning the shelf ID "0" to the service board of the master shelf directly, and for the slave shelf, the main control board of the slave shelf returning the shelf ID obtained from the main control board of the master shelf to the service board of the slave shelf; and B3. modifying, by the service board of the master shelf or the slave shelf, its own MAC address according to the obtained shelf ID and slot ID; and C. performing communication between the main control board of the master shelf and the main control board of the slave shelf, and between the main control board of the master shelf and the service board of the slave shelf through the configured MAC addresses, wherein each of the MAC addresses comprises location information of the corresponding board of the corresponding shelf, and wherein the location information comprises a shelf ID and a slot ID.

* * * * *